(12) United States Patent
Lee et al.

(10) Patent No.: US 8,205,463 B2
(45) Date of Patent: Jun. 26, 2012

(54) AIR CONDITIONER AND METHOD OF CONTROLLING THE SAME

(75) Inventors: Hae Yen Lee, Seoul (KR); Dong Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 578 days.

(21) Appl. No.: 12/379,376

(22) Filed: Feb. 19, 2009

(65) Prior Publication Data

US 2009/0216377 A1    Aug. 27, 2009

(30) Foreign Application Priority Data

Feb. 20, 2008   (KR) .................. 10-2008-0015131

(51) Int. Cl.
*F25B 41/04* (2006.01)
*G05D 23/00* (2006.01)
(52) U.S. Cl. ............... 62/210; 62/222; 700/299
(58) Field of Classification Search .......... 62/200, 62/210, 222, 231, 158; 700/275, 299
See application file for complete search history.

(56) References Cited

U.S. PATENT DOCUMENTS

| | | | |
|---|---|---|---|
| 4,506,518 A | | 3/1985 | Yoshikawa et al. |
| 4,644,756 A | * | 2/1987 | Sugimoto et al. ............... 62/160 |
| 4,873,836 A | * | 10/1989 | Thompson ...................... 62/158 |
| 5,303,562 A | | 4/1994 | Bahel et al. |
| 2005/0284163 A1 | * | 12/2005 | Hwang et al. .................. 62/222 |
| 2005/0284164 A1 | | 12/2005 | Ohta |

FOREIGN PATENT DOCUMENTS

| | | |
|---|---|---|
| EP | 0 345 545 | 12/1989 |
| EP | 1 586 836 | 10/2005 |
| EP | 1 624 257 | 2/2006 |
| JP | 09280681 A * | 10/1997 |

* cited by examiner

*Primary Examiner* — Chen Wen Jiang
(74) *Attorney, Agent, or Firm* — McKenna Long & Aldridge LLP

(57) ABSTRACT

An air conditioner is provided. The air conditioner includes a first temperature sensor configured to measure an indoor temperature during a heating operation, a second temperature sensor configured to measure a discharge temperature of a compressor, a valve provided at an outlet side of an indoor heat exchanger during the heating operation, and a controller configured to control an opening of the valve by comparing a temperature detected by the first temperature sensor with a temperature detected by the second temperature sensor.

8 Claims, 4 Drawing Sheets

AIR CONDITIONER AND METHOD OF CONTROLLING THE SAME

CROSS-REFERENCE TO RELATED APPLICATIONS

The present application claims priority under 35 U.S.C. 119 and 35 U.S.C. 365 to Korean Patent Application No. 10-2008-0015131 (filed on Feb. 20, 2008), which is hereby incorporated by reference in its entirety.

BACKGROUND

Embodiments relate to an air conditioner and a method of controlling the same.

Generally, an air conditioner is an apparatus that cools or heats air within an inner space of a building, etc. Today, a multi air conditioner that can independently cool or heat separated rooms of an indoor space in order to further efficiently cool and heat the indoor space partitioned into the plurality of rooms is being continuously developed.

The air conditioner includes an outdoor unit provided with an indoor heat exchanger and an indoor unit provided with an indoor heat exchanger.

In case where the air conditioner operates in a cooling mode, the outdoor heat exchanger functions as a condenser, and the indoor heat exchanger functions as an evaporator. On the other hand, in case where the air conditioner operates in a heating mode, the outdoor heat exchanger functions as the evaporator, and the indoor heat exchanger functions as the condenser.

When a heating operation of the air conditioner starts, an indoor linear expansion valve is opened, and a refrigerant flows. A controller transmits a driving signal to a compressor. After the compressor receives the driving signal, the compressor operates after a predetermined time passes. This is done because a communication time and a waiting time for stably driving the compressor are required.

Thus, according to the related art air conditioner, since the heating operation of the compressor starts, and then, the compressor operates after the predetermined time passes, a pressure of an outlet side pressure of the compressor is low, and thus, a pressure of a gaseous refrigerant flowing into the indoor heat exchanger functioning as the condenser is low. Therefore, the refrigerant passing through the indoor heat exchanger is not condensed and is exhausted in a gaseous state. In addition, since the refrigerant in the gaseous state passes through the opened indoor linear expansion valve, a noise occurs.

SUMMARY

Embodiments provide an air conditioner that can reduce a refrigerant flow noise generated in an indoor unit during an initial heating operation and a method of controlling the same.

In one embodiment, an air conditioner includes: a first temperature sensor configured to measure an indoor temperature during a heating operation; a second temperature sensor configured to measure a discharge temperature of a compressor; a valve provided at an outlet side of an indoor heat exchanger during the heating operation; and a controller configured to control an opening of the valve by comparing a temperature detected by the first temperature sensor with a temperature detected by the second temperature sensor.

In another embodiment, a method of controlling an air conditioner includes: selecting a heating operation to operate a compressor; determining an opening condition of a valve provided at an outlet side of an indoor heat exchanger constituting an indoor unit after the compressor operates; and opening the valve in case where the opening condition of the valve is satisfied.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
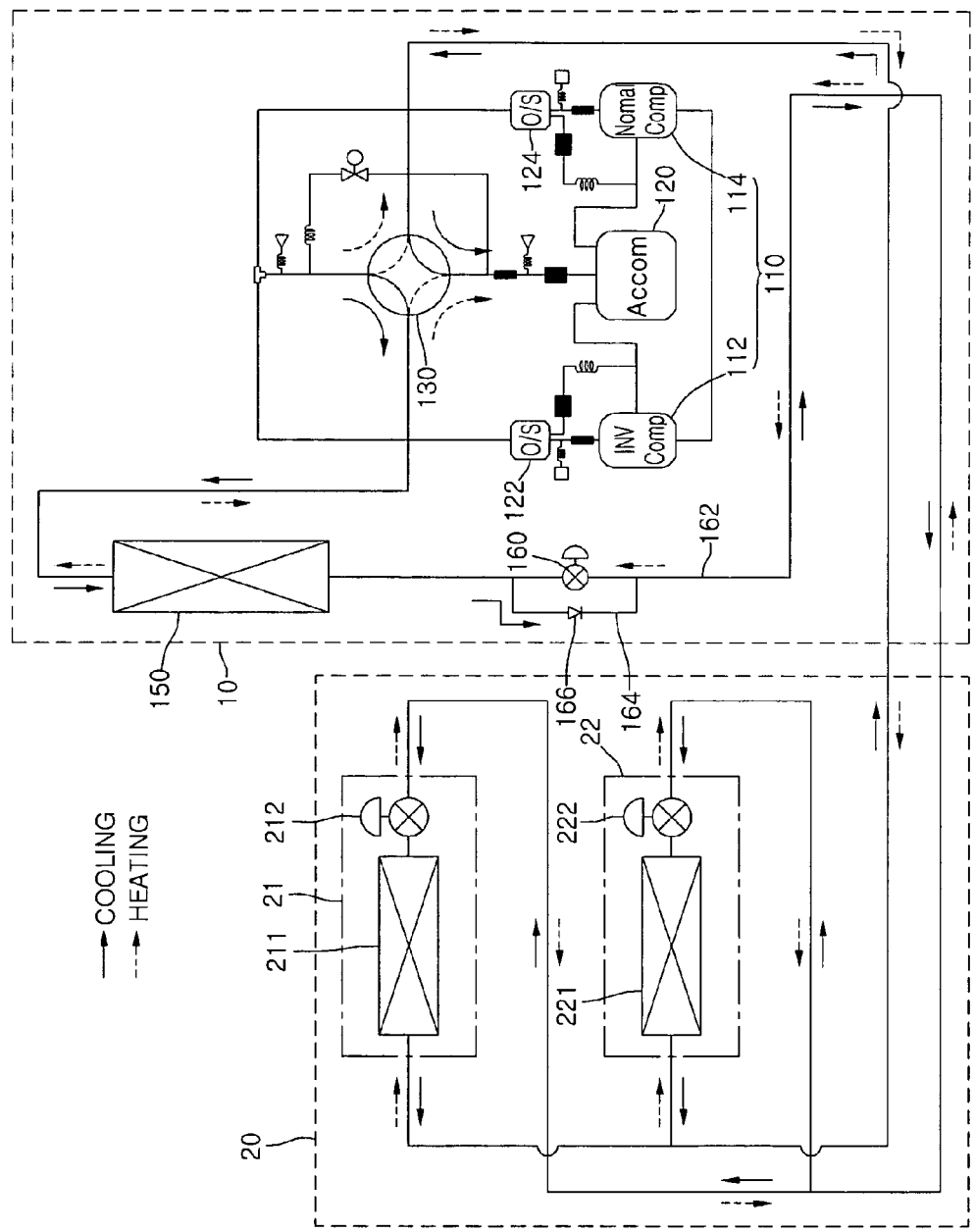
FIG. 1 is a schematic view illustrating a refrigerant cycle of an air conditioner according to an embodiment.

FIG. 1 is a schematic view illustrating a refrigerant cycle of an air conditioner according to an embodiment.

Referring to FIG. 1, an air conditioner according to an embodiment includes at least one outdoor unit 10 and at least one indoor unit 20 connected to the outdoor unit 10.

Although one outdoor unit 10 and first and second indoor units 21 and 22 are exemplified as illustrated in FIG. 1, the numbers of the outdoor unit 10 and the indoor unit 20 are not limited.

The outdoor unit includes a compression unit 110, an outdoor heat exchanger 150, and a four-way valve 130. The four-way valve 130 changes a refrigerant flow direction according to a heating or cooling operation of the air conditioner.

The indoor units 21 and 22 include indoor heat exchangers 211 and 221 and indoor linear expansion valves (LEVs) 212 and 222, respectively.

In detail, the compression unit 110 includes an inverter compressor 112 operating at a variable speed and a constant speed compressor 114 operating at a constant speed.

Thus, in case of a low load capacity with a small number of indoor units used, the inverter compressor 112 operates first, and in case where a load capacity gradually increases to exceed a capacity of the inverter compressor 112, the constant speed compressor 114 operates.

An accumulator 120 allowing the gaseous refrigerant to be introduced into the compressors 112 and 114 is connected to inlet sides of the compressors 112 and 114. Oil separators 122 and 124 for separating oil from the refrigerant discharged from the compressors 112 and 114 are provided at outlet sides of the compressors 112 and 114, respectively. The oil separators 122 and 124 communicate with intake sides of the compressors 112 and 114, respectively.

The compressors 112 and 114 are connected to the four-way valve 130 changing the flow direction of the refrigerant discharged from the compressors 112 and 114. The refrigerant discharged from the compressors 112 and 114 is selectively moved to the outdoor heat exchanger 150 or the indoor heat exchangers 211 and 221 due to the four-way valve 130.

An outdoor linear expansion valve 160 is provided in a connection pipe 162 connecting the outdoor heat exchanger 150 to the indoor units 21 and 22. A parallel pipe 164 is provided parallel to the connection pipe 162 based on the outdoor linear expansion valve 160. When the outdoor heat exchanger 150 functions as a condenser, the refrigerant flows into the parallel pipe 164.

The parallel pipe 164 includes a check valve 166. The check valve 166 prevents the flow of the refrigerant when the outdoor heat exchanger 150 functions as an evaporator and passes the refrigerant when the outdoor heat exchanger 150 functions as the condenser.

The heating and cooling operations of the air conditioner will now be described.

First, in the cooling operation, the refrigerant discharged from the compressors 112 and 114 flows into the outdoor heat exchanger 150 by adjusting a passage of the four-way valve 130. The refrigerant passing through the outdoor heat exchanger 150 is condensed. The refrigerant discharged from the outdoor heat exchanger 150 passes through the check valve 166 and the indoor linear expansion valves 212 and 222, and then is expanded. The expanded refrigerant is evaporated while the refrigerant passes through the indoor heat exchangers 211 and 221, and then is introduced into the compressors 112 and 114 through the accumulator 120.

On the other hand, in the heating operation, the refrigerant discharged from the compressors 112 and 114 flows into the indoor heat exchangers 211 and 221 by adjusting a passage of the four-way valve 130. The refrigerant passing through the indoor heat exchangers 211 and 221 is condensed. The refrigerant discharged from the indoor heat exchangers 211 and 221 is expanded while the refrigerant passes through the outdoor linear expansion valve 160. The expanded refrigerant is evaporated while the refrigerant passes through the outdoor heat exchanger 150, and then is introduced into the compressors 112 and 114 through the accumulator 120.

Figure 2:
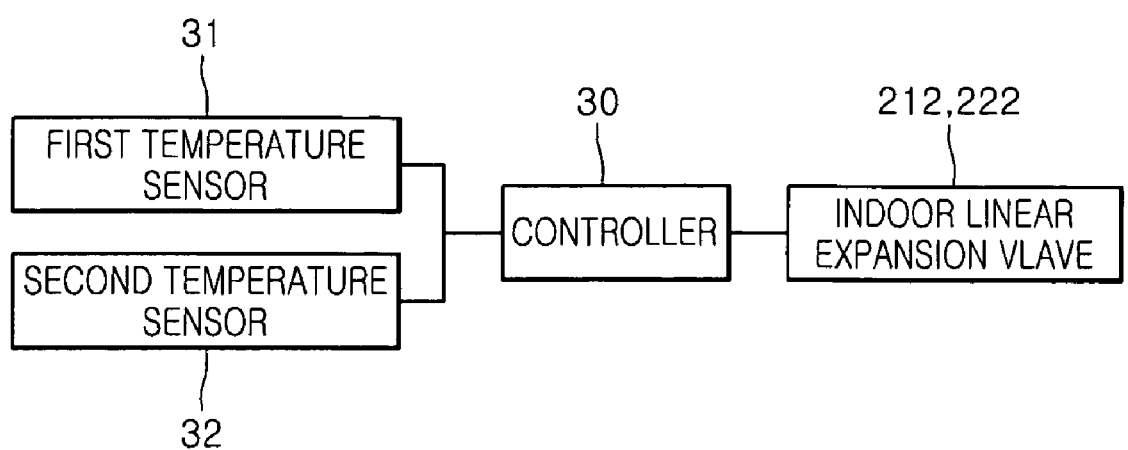
FIG. 2 is a block diagram illustrating a configuration for controlling an air conditioner according to an embodiment.

FIG. 2 is a block diagram illustrating a configuration for controlling an air conditioner according to an embodiment.

Referring to FIG. 2, an air conditioner according to this embodiment includes a controller 30 for controlling overall operations of the air conditioner, a first temperature sensor 31 for detecting an indoor temperature, a second temperature sensor 32 for detecting discharge temperatures of the compressors 112 and 114, and indoor linear expansion valves 211 and 221 that is opened or closed under the control of the controller 30 according to a comparison result of temperatures detected by the temperature sensors 31 and 32.

Although not shown, indoor/outdoor fan motors, a compressor, and an outdoor linear expansion valve may be controlled by the controller 30.

In an initial heating operation, the controller 30 opens or closes the indoor linear expansion valves 211 and 221 by comparing the temperature detected by the first temperature sensor 31 with the temperature detected by the second temperature sensor 32.

The reason that the indoor linear expansion valves 211 and 221 are opened or closed through comparison with the temperatures detected by each of the temperature sensors 31 and 32 is intended to reduce a refrigerant flow noise generated in an indoor unit during the initial heating operation. A detailed description with respect to the reason will be described later.

Here, the second temperature sensor 32 measures the discharge temperatures of the compressor 112 and 114. More particularly, since an inverter compressor 112 of the compressors 112 and 114 operates first, the temperature detected by the second temperature sensor 32 may be a discharge refrigerant temperature of the inverter compressor 112.

Figure 3:
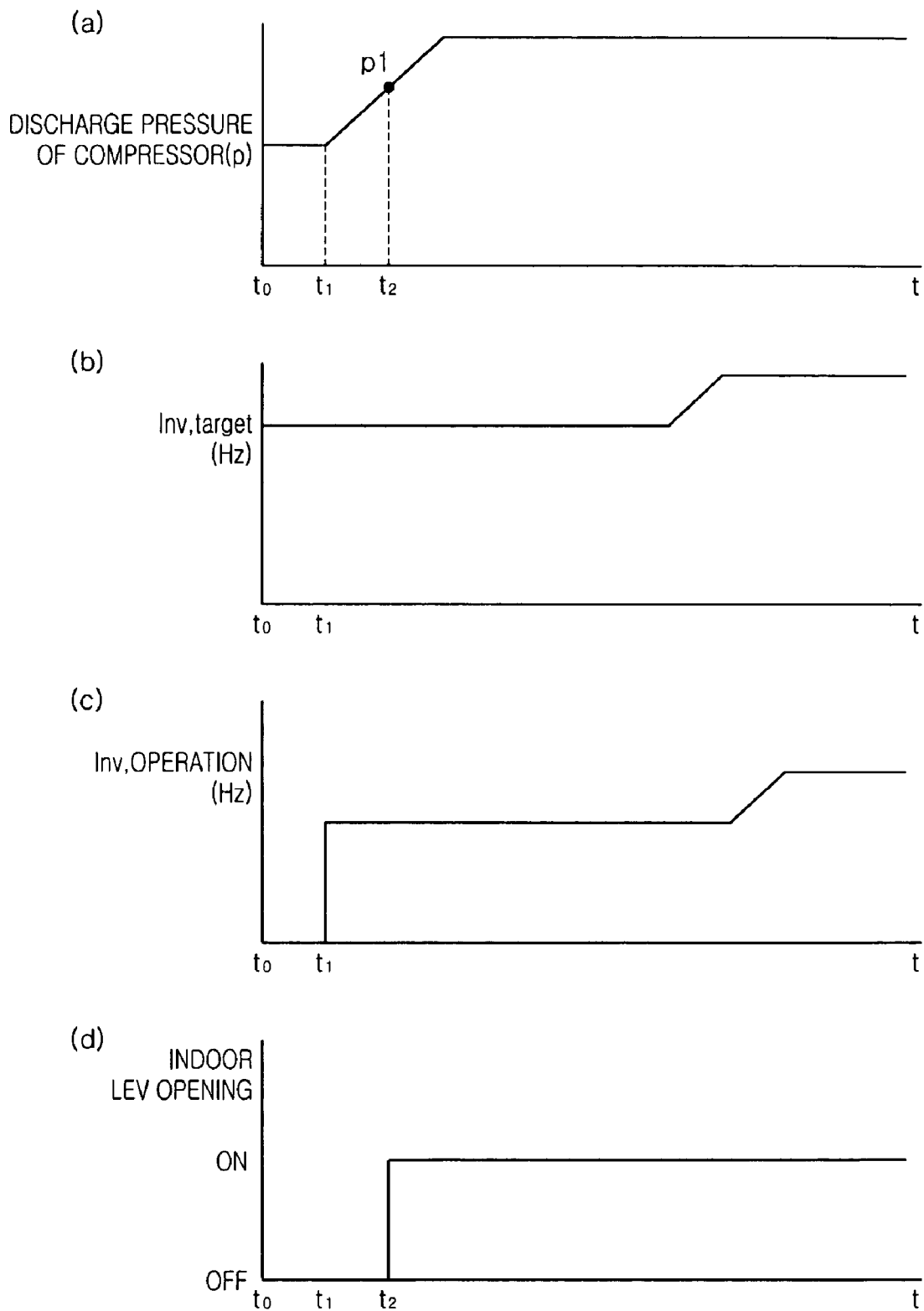
FIG. 3 is a graph illustrating an operation state of an air conditioner when the air conditioner operates in a heating mode.
Figure 4:
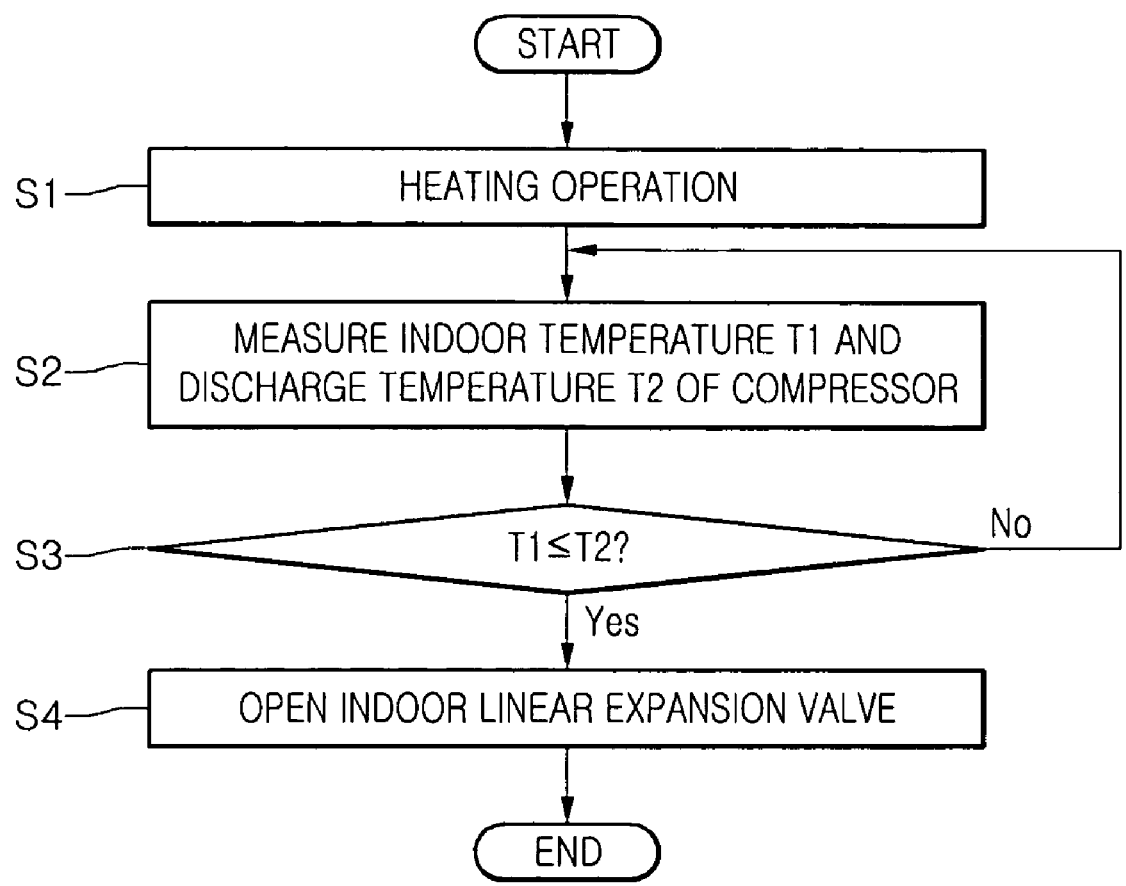
FIG. 4 is a flowchart illustrating a method of controlling an air conditioner according to an embodiment.

FIG. 3 is a graph illustrating an operation state of an air conditioner when the air conditioner operates in a heating mode, and FIG. 4 is a flowchart illustrating a method of controlling an air conditioner according to an embodiment.

FIG. 3(a) is a graph illustrating a discharge pressure of a compressor according to lapse of time, and FIG. 3(b) is a graph illustrating a target frequency of a compressor according to lapse of time. FIG. 3(c) is a graph illustrating a frequency of an actual compressor according to lapse of time, and FIG. 3(d) is a graph illustrating an opening of an indoor linear expansion valve according to lapse of time.

Referring to FIGS. 3 and 4, a heating operation starts by a user's selection in operation S1. Then, an outdoor linear expansion valve 160 is opened by a controller 30, and an operation signal including a target frequency is transmitted to a compressor 112. At this time, the indoor linear expansion valves 212 and 222 maintain in close state. Thus, a refrigerant of the inside or and inlet side of indoor heat exchangers 211 and 221 does not pass through the indoor linear expansion valves 212 and 222.

As illustrated in FIGS. 3(a) and 3(c), the compressor 112 does not operate at once when the heating operation starts. Thus, although the heating operation starts, a discharge temperature and pressure of the compressor 112 does not increase.

The compressor 112 operates after the heating operation starts and a predetermined time t1 passes. Then, the discharge pressure of the compressor 112 increases as illustrated in FIG. 3(a).

In operation S2, after the compressor 112 operates, an indoor temperature T1 is detected by a first temperature sensor 31, and a discharge refrigerant temperature T2 of the compressor 112 is detected by a second temperature sensor 32.

In operation S3, the controller 30 compares the detected indoor temperature T1 with the detected discharge temperature T2 of the compressor 112. In this embodiment, a process in which the indoor temperature T1 is compared with the discharge temperature T2 of the compressor 112 may be referred to as "an opening condition determination process of the indoor linear expansion valve".

At this time, the temperature of the refrigerant before the compressor 112 operates is lower than the indoor temperature. The temperature and pressure of the discharge refrigerant increases after the compressor 112 operates. When a predetermined time t2 passes, the discharge temperature T2 of the compressor 112 is greater than the indoor temperature T1. Here, the predetermined time t2 may be not a fixed value, but a variable value. In this embodiment, a time from a time at which the heating operation starts to the predetermined time t2 may be referred to as "an opening delay time of the indoor linear expansion valve".

A discharge pressure at which the discharge temperature T2 of the compressor 112 is equal to the indoor temperature T1 is P1. The discharge pressure P1 has a value greater than a pressure before the compressor 112 operates (including the moment of the operation).

The discharge pressure P1 has a value equal to or greater than a minimum pressure value at which the refrigerant having a gaseous state can be condensed while the refrigerant having the gaseous state passes through the indoor heat exchangers 211 and 221.

If it is determined that the detected discharge temperature T2 is above the detected indoor temperature T1 in the operation S3, the indoor linear expansion valves 212 and 222 are opened by the controller 30.

Thus, since a gaseous refrigerant having the pressure P1 passes through the indoor heat exchangers 211 and 221, a portion of the gaseous refrigerant is condensed while the gaseous refrigerant passes through the indoor heat exchangers 211 and 221. Thus, the refrigerant discharged from the indoor heat exchangers 211 and 221 has two-phase states. The refrigerant having the two-phase states passes through the indoor linear expansion valves 212 and 222.

Since the refrigerant having the two-phase states passes through the indoor linear expansion valves 212 and 222, a refrigerant flow noise may be reduced when compared with a refrigerant flow noise in case where only the gaseous refrigerant passes through the indoor linear expansion valves 212 and 222.

This embodiment is intended to reduce a ratio of the gaseous refrigerant of the refrigerant passing through the indoor linear expansion valves 212 and 222. Thus, although the refrigerant passing through the indoor linear expansion valves 212 and 222 has the two-phase states in this embodiment, the present disclosure is not limited thereto. For example, a liquid refrigerant may pass through the indoor linear expansion valves 212 and 222 in case where the pressure P1 is set too high.

According to this embodiment, in the initial heating operation, the indoor linear expansion valves are opened when an opening condition of the indoor linear expansion valves is satisfied after the compressor operates, and the refrigerant passes through the indoor linear expansion valves. Thus, the refrigerant flow noise can be reduced.

That is, since the pressure of the refrigerant discharged from the compressor is equal to or greater than the minimum pressure at which the refrigerant can be condensed in the indoor heat exchangers, the gaseous refrigerant has the two-phase states after the gaseous refrigerant passes through the indoor heat exchangers. Thus, the refrigerant flow noise can be reduced when compared with the refrigerant flow noise in case where only the gaseous refrigerant passes through the indoor linear expansion valves.

In this embodiment, the plurality of indoor units is connected to the outdoor unit. Thus, the indoor linear expansion valves are provided in the indoor units, respectively. Temperatures of rooms in which the indoor units are respectively installed can be detected independently. Thus, in case where a temperature of a room in which a first indoor unit is installed is different from that of a room in which a second indoor unit is installed, an opening time of each of the indoor linear expansion valves disposed in each of the indoor units may be different from each other.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
a first temperature sensor configured to measure an indoor temperature during a heating operation;
a second temperature sensor configured to measure a discharge temperature of a compressor;
a valve provided at an outlet side of an indoor heat exchanger coupled to the compressor; and
a controller configured to control operation of the valve according to a result obtained by comparing a temperature detected by the first temperature sensor with a temperature detected by the second temperature sensor.

2. The air conditioner according to claim 1, wherein operation of the valve is delayed until expiration of a preset amount of time after the compressor operates.

3. The air conditioner according to claim 2, wherein the controller causes the valve to open when the temperature detected by the second temperature sensor is above the temperature detected by the first temperature sensor.

4. The air conditioner according to claim 1, wherein the valve comprises an indoor linear expansion valve.

5. A method of controlling an air conditioner comprising a valve provided at an outlet side of an indoor heat exchanger constituting an indoor unit, the method comprising:
operating a compressor if a heating operation is selected;
determining if an opening condition of the valve is satisfied based on at least one condition of the compressor after the compressor operates; and
opening the valve if the opening condition of the valve is satisfied,
wherein, when the compressor operates, a discharge temperature of the compressor and an indoor temperature are detected, and the opening condition of the valve is determined by comparing the detected discharge temperature of the compressor with the detected indoor temperature.

6. The method according to claim 5, wherein the opening condition of the valve is satisfied, and the valve is opened, if the discharge temperature of the compressor is above the indoor temperature.

7. The method according to claim 5, wherein the indoor unit is provided in plurality, each of the indoor units comprises the valve, and the opening condition of each of the valves is satisfied at times that are equal to or different from each other according to a temperature of a room in which each of the indoor units is installed.

8. The method according to claim 5, wherein the valve comprises an indoor linear expansion valve.

* * * * *